United States Patent
Mound

(10) Patent No.: US 9,928,683 B2
(45) Date of Patent: Mar. 27, 2018

(54) SYSTEM AND METHOD FOR GAME PLAYERS TO ACHIEVE MULTIPLE STATUS LEVELS IN A GAME ACCOUNT FROM VISITS TO AUTHORIZED LOCATIONS

(71) Applicant: Scientific Games International, Inc., Newark, DE (US)

(72) Inventor: Andrew Jonathan Mound, Atlanta, GA (US)

(73) Assignee: Scientific Games International, Inc., Newark, DE (US)

( * ) Notice: Subject to any disclaimer, the term of this patent is extended or adjusted under 35 U.S.C. 154(b) by 35 days.

(21) Appl. No.: 14/949,054

(22) Filed: Nov. 23, 2015

(65) Prior Publication Data
US 2016/0155292 A1 Jun. 2, 2016

Related U.S. Application Data

(60) Provisional application No. 62/085,887, filed on Dec. 1, 2014.

(51) Int. Cl.
*A63F 9/24* (2006.01)
*A63F 13/00* (2014.01)
(Continued)

(52) U.S. Cl.
CPC ..... *G07F 17/3239* (2013.01); *G06Q 20/3278* (2013.01); *G07F 17/323* (2013.01);
(Continued)

(58) Field of Classification Search
CPC .......... A63F 2300/205; A63F 2300/306; A63F 2300/5573; A63F 13/216
See application file for complete search history.

(56) References Cited

U.S. PATENT DOCUMENTS 6,632,142 B2 * 10/2003 Keith ............... A63F 13/12
463/42
9,208,652 B2 12/2015 Aligizakis et al.
(Continued)

FOREIGN PATENT DOCUMENTS

WO WO 2014/179323 A1 11/2014

OTHER PUBLICATIONS

International Search Report & Written Opinion, dated Feb. 10, 2016.
(Continued)

*Primary Examiner* — Kevin Y Kim
(74) *Attorney, Agent, or Firm* — Dority & Manning, P.A.

(57) ABSTRACT

A system and method are provided for game players to accumulate points in their personal game account and achieve different hierarchy status levels. Authorized communication-enabled locations are configured with a transmitter device that broadcasts an ID signal unique to the location or a receiver that receives an ID signal unique to a particular player. The players are provided with capability to receive the unique ID signals emitted by the transmitter devices, or to broadcast the ID signal unique to the player for receipt by the receiver in the locations. Point values are assigned to different game-related activities performed by the players at the locations. A game server automatically identifies the player and the particular location upon receipt of a transmission of one of the unique ID signals and automatically credits the player's account with the points assigned to the activities.

14 Claims, 5 Drawing Sheets

(51) Int. Cl.
  *G06F 17/00* (2006.01)
  *G06F 19/00* (2011.01)
  *G07F 17/32* (2006.01)
  *H04L 29/08* (2006.01)
  *G06Q 20/32* (2012.01)
  *H04W 4/00* (2018.01)
  *H04W 4/02* (2018.01)
  *H04W 4/20* (2018.01)

(52) U.S. Cl.
  CPC ...... *G07F 17/3206* (2013.01); *G07F 17/3248* (2013.01); *G07F 17/3262* (2013.01); *G07F 17/3286* (2013.01); *H04L 67/22* (2013.01); *H04W 4/008* (2013.01); *H04W 4/021* (2013.01); *H04W 4/206* (2013.01)

(56) References Cited

U.S. PATENT DOCUMENTS

| | | |
|---|---|---|
| 2002/0082921 A1 | 6/2002 | Rankin |
| 2002/0090985 A1* | 7/2002 | Tochner ............... A63F 13/12 463/1 |
| 2006/0025222 A1 | 2/2006 | Sekine |
| 2008/0146338 A1* | 6/2008 | Bernard ............... A63F 13/00 463/42 |
| 2009/0005140 A1* | 1/2009 | Rose ............... A63F 13/00 463/7 |
| 2009/0017913 A1* | 1/2009 | Bell ............... A63F 13/46 463/40 |
| 2009/0113296 A1* | 4/2009 | Lacy ............... G01C 21/3667 715/700 |
| 2010/0211431 A1 | 8/2010 | Lutnick et al. |
| 2011/0081958 A1 | 4/2011 | Herrmann et al. |
| 2011/0086693 A1 | 4/2011 | Guziel et al. |
| 2012/0094769 A1 | 4/2012 | Nguyen et al. |
| 2012/0214568 A1 | 8/2012 | Herrmann |
| 2013/0017884 A1 | 1/2013 | Price et al. |
| 2013/0065584 A1 | 3/2013 | Lyon et al. |
| 2013/0116032 A1 | 5/2013 | Lutnick |
| 2013/0157569 A1* | 6/2013 | Torvmark ............... H04W 4/008 455/41.2 |
| 2014/0051507 A1 | 2/2014 | Shapiro et al. |
| 2014/0222574 A1 | 8/2014 | Emigh et al. |
| 2014/0370959 A1 | 12/2014 | Yacenda |

OTHER PUBLICATIONS

Co-Pending U.S. Appl. No. 14/948,833, filed Nov. 23, 2015.
Co-Pending U.S. Appl. No. 14/948,899, filed Nov. 23, 2015.
Co-Pending U.S. Appl. No. 14/948,958, filed Nov. 23, 2015.
Co-Pending U.S. Appl. No. 14/949,011, filed Nov. 23, 2015.
Co-Pending U.S. Appl. No. 14/949,096, filed Nov. 23, 2015.
Co-Pending U.S. Appl. No. 14/949,150, filed Nov. 23, 2015.
Co-Pending U.S. Appl. No. 14/859,999, filed Sep. 21, 2015.

* cited by examiner

SYSTEM AND METHOD FOR GAME PLAYERS TO ACHIEVE MULTIPLE STATUS LEVELS IN A GAME ACCOUNT FROM VISITS TO AUTHORIZED LOCATIONS

RELATED APPLICATION

The present application claims priority to U.S. Provisional Patent Application No. 62/085,887, filed Dec. 1, 2014, the entire disclosure of which is incorporated herein by reference in its entirety for all purposes.

FIELD OF THE INVENTION

The present invention relates to conducting games, such as lottery games, wherein players may accumulate credit or points in a personal player's account and achieve different status levels.

BACKGROUND

Lottery games have become a time honored method of raising revenue for state and federal governments the world over. The success of these games, however, depends on continuous innovations that capture the interests of current players and draw new players to the games.

As with other consumers, lottery players are becoming more tech savvy, and are interested in conducting various gaming aspects via electronic devices, such as smart phones. The gaming industry is appreciative of this fact, and is seeking ways to integrate games and gaming-related functions into the rapidly developing mobile electronic communication age.

With conventional systems and methods, authorized retail vendors within a lottery jurisdiction are the primary means of lottery ticket sales and distribution. This relationship has been beneficial to the vendors in that lottery players also tend to purchase additional goods in the retail establishment. The gaming authority (e.g., a state or other governmental lottery authority) benefits in that a wide and varied sales and distribution network is provided by the authorized retail establishments.

It is important that new innovations in the gaming industry, particularly with respect to electronic gaming via smart phones or other portable mobile devices, attempt to preserve this mutually beneficial relationship. This is of particular concern to the retail vendors as electronic and on-line lottery ticket sales are growing in acceptance and popularity, and could potentially decrease lottery player traffic to the retail establishments.

The lottery industry is thus continuously seeking new and creative gaming scenarios that provide increased entertainment value to players, entice new players, and expand play of lottery games into the smart electronic communication age while at the same time maintaining or increasing lottery player foot traffic to the conventional ticket sales retail establishments

SUMMARY OF THE INVENTION

Objects and advantages of the invention will be set forth in part in the following description, or may be obvious from the description, or may be learned through practice of the invention.

In particular embodiments, a system and method are provided wherein game of chance players, for example lottery game players, have a personal player's account and accumulate points or credit in their account to achieve different hierarchy status levels. The players advance in the status level hierarchy (e.g., from bronze, to silver, to gold) as points are accumulated. Gaming-related privileges or benefits of increasing value are associated with the hierarchy of status levels.

A plurality of physical locations, such as a retail store, convenience store, pub, restaurant, and so forth, are authorized by the gaming authority as communication-enabled locations and are configured with a transmitter device, such as a BTLE (Bluetooth Low Energy) beacon, that broadcasts an ID signal unique to the communication-enabled location or a receiver that receives an ID signal unique to a particular player that visits the location. The identity and location of the communication-enabled locations are published to the players, for example via an electronic map at a website accessible by the players.

The players are provided with the capability to receive the unique ID signals emitted by the transmitter devices within the communication-enabled locations on a mobile smart device, or to broadcast the ID signal unique to the player for receipt by the receiver in the communication-enabled locations.

Point values are assigned to different game-related activities that can be performed by the players at the communication-enabled locations. These activities can vary widely within the scope and spirit of the invention, and may include simply visiting the location, checking ticket status at the location, buying game tickets at the location, playing a game at the location, and so forth.

A game server is common to the communication-enabled locations and, when the player is in one of the locations, automatically identifies the player and the particular communication-enabled location upon receipt of a transmission that includes at least part of the ID signal unique to the communication-enabled location or the ID signal unique to the player. Upon performance of one or more of the activities at the location, the game server automatically credits the player's account with the points assigned to the respective activities. The game server generates and provides a personalized message to the player in the communication-enabled location regarding the points assigned to their respective player account.

BRIEF DESCRIPTION OF THE DRAWINGS

A full and enabling description of the present invention is provided herein, with reference to particular embodiments depicted in the attached drawings and described below.

DETAILED DESCRIPTION

Figure 1:
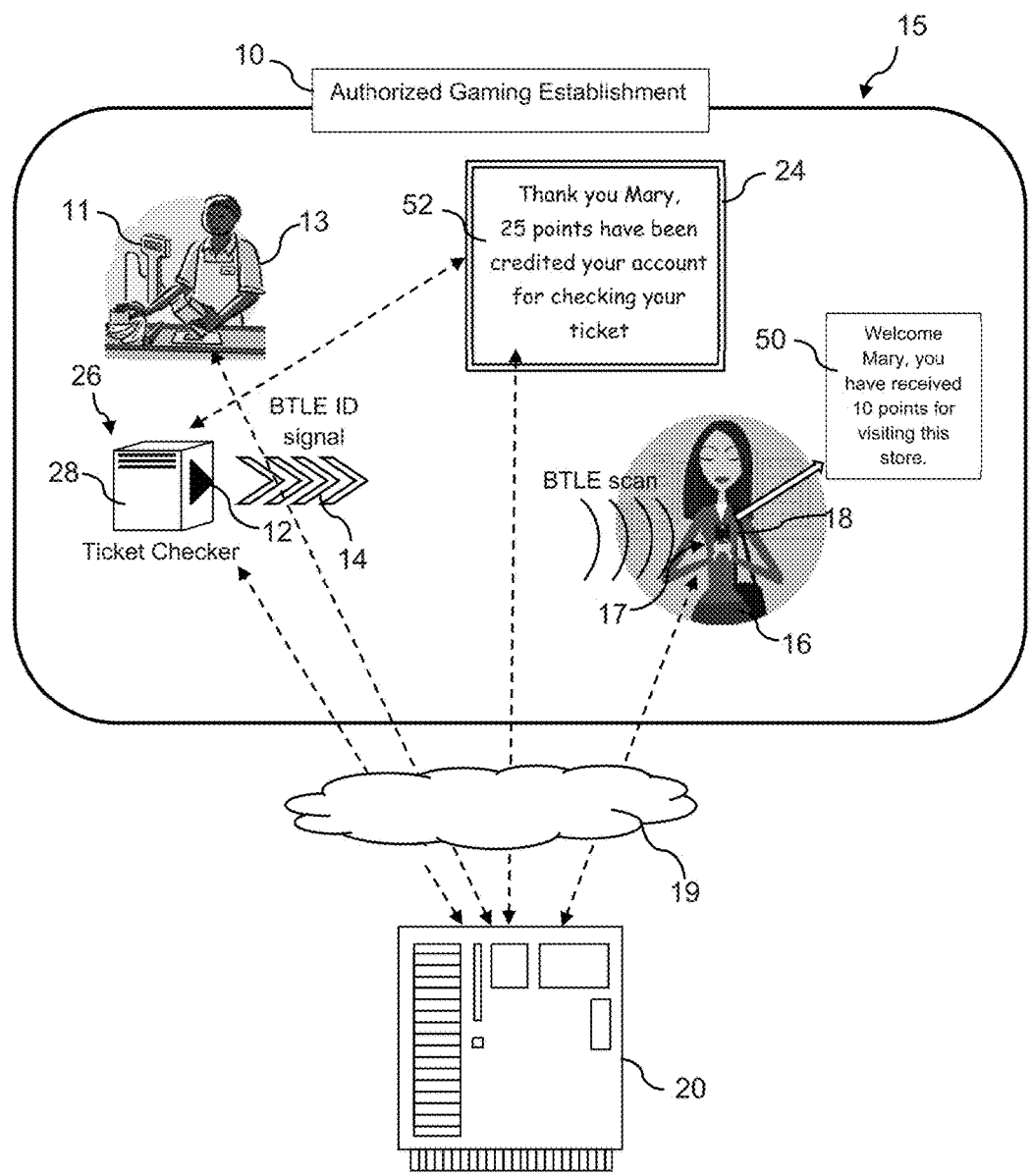
FIG. 1 is a diagram illustration of a system and method for conducting aspects of the present invention wherein a player visits a communication-enabled location to collect points to be added to their player account.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer and communication device-implemented methods and systems for conducting aspects of a game, such as a lottery game, at remote locations, wherein players visit the locations to conduct the gaming activities. For sake of example only, the following discussion relates to embodiments of the invention drawn to lottery primary games, bonus games, and second chance games sponsored by state or other jurisdictional lottery authorities. It should be appreciated, however, that the system and method are just as applicable to gaming activities linked to any manner of other gaming authority, such as games conducted within a gaming establishment (e.g., a casino) for patrons of such establishment, or electronic games conducted via an electronic network, such as the internet, for authorized players.

FIG. 1 is a diagram illustration of a system and method 15 in accordance with an embodiment of the invention. An establishment or location 10, such as a retail store, convenience store, pub, restaurant, or the like, is authorized by a lottery jurisdiction to carry out lottery activities, such as the sale of instant scratch-off tickets via a clerk 13, or terminal based tickets for draw games such as Powerball™ issued from a lottery terminal 11. The lottery jurisdiction may be a state lottery authority, such as the Pennsylvania Lottery Authority, or any other governmental jurisdictional authority. A separate game provider may be partnered with the lottery jurisdiction to provide certain control, implementation, and logistical functions of the game. It should be appreciated that the type of location 10 or lottery jurisdiction entities are not limiting factors of the invention.

A plurality of the locations 10 within the lottery jurisdiction are each equipped with a communication device, such as a transmitter device 12 or scanner/receiver device 17 (FIG. 3), wherein an intermittently transmitted data packet or signal 14 is transmitted and received within a limited range within the location 10. In this regard, the locations 10 are referred to as communication-enabled locations. It has been found that Bluetooth Low Energy (BTLE) technology is particularly well-suited for use with the present subject matter. For example, the transmitter devices 12 may be BTLE beacons and the scanner/receiver devices 17 may be any component configured to receive and recognize the BTLE formatted signal 14.

BTLE devices are well-known to those skilled in the art, and a detailed explanation of their function and operation is not necessary for an understanding and appreciation of the present invention. Briefly, BTLE beacons are a class of low-energy, low-cost radio transmitters that can notify mobile smart devices 18 (e.g., iOS 7 smart phones) running BTLE applications of their presence, which in turn enables the smart device 18 to perform certain actions when in close proximity to the beacon. These devices are often referred to as "iBeacons", which is the name Apple chose for its implementation of the BTLE technology. Each BTLE beacon broadcasts a unique identification signal 14 using the BTLE standard format. These signals 14 are also known as iBeacon "advertisements." The mobile smart device 18 runs a background application that enables the device to scan for and receive the signals 14 within transmitting range of the BTLE beacons. The mobile smart device 18 will automatically "react" to the received signal 14 and may start other BTLE-enabled applications for various purposes, including communication with a central server 20.

A typical use of BTLE technology is relatively precise indoor geo-location ("micro-location"). A BTLE-enabled application on the mobile smart device is notified when the device moves in an out of range of the BTLE beacon, and thus is able to determine distance to the transmitter. The exact geo-location of the transmitter is known, and thus the exact location of the mobile smart device is calculated based on relative distance from the transmitter as a function of signal strength. With this location information, a server in communication with the smart device can generate a message to the person telling them, for example, that a number of close-by items in the store are on sale, and so forth.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

Referring again to FIG. 1, a patron 16 is depicted within the authorized gaming location 10, which may be a grocery store or convenience store authorized by a respective lottery jurisdiction to conduct lottery related activities within the lottery jurisdiction. In this particular embodiment, the location 10 has one or more transmitter devices 12, such as BTLE beacons, at strategic locations to transmit a BTLE ID signal 14 that is unique to the particular transmitter (and thus unique to the location 10) to areas of the location 10 in which the patrons 16 are likely to pass or visit. Any number and pattern of the transmitters 12 may be deployed to ensure select or complete coverage of the public areas of the location. In this regard, the location 10 is considered as "communication-enabled." The transmitters 12 may be hidden from view or disguised as some other component, e.g., an air freshener or camera. In particular embodiments, the transmitter 12 is incorporated with another functional component 26 of the overall lottery or gaming system. For example, the location 10 may provide an electronic ticket checker 28 wherein lottery game players can scan a previously purchased ticket to check whether or not such ticket is entitled to a prize. The ticket checker 28 may be used by the player 16 to scan losing primary game tickets for purposes set forth herein. The transmitter 12 may be configured on or within the ticket checker 28.

As discussed above, the beacon or transmitter device 12 (referred to generically as "transmitter" herein) may function in "transmit" or "peripheral" mode wherein it intermittently broadcasts its unique ID signal 14. If the transmitter 12 is a BTLE beacon, then the signal 14 is transmitted using the BTLE standard format. The signal 14 is unique to the transmitter 12. Thus, by maintaining a library of the transmitter devices 12 (and their unique ID signals 14) and their respective locations, a game server 20 can readily determine which transmitters 12 are within each communication-enabled location 10.

The patron 16 within the location 10 may also be a game player, in which the player 16 has on their person a mobile smart device 18, such as a smart phone, tablet, PDA, or other network-enabled device (all referred to herein generically as a "mobile smart device"). The mobile smart device 18 runs a low-power background application previously downloaded by the player 16 from a source (e.g. a website) maintained by the lottery authority or lottery game provider. This application allows the mobile smart device 18 to function as a scanner or receiver 17 in a scan or "central" mode to receive the signals 14 if within range of the transmitters 12. Once the mobile smart device 18 detects a signal 14 from the transmitter 12, certain other application functions are initiated. For example, the mobile smart device 18 will automatically "react" to the received signal 14 and start other BTLE-enabled applications.

The location 10 may be equipped with any manner of additional functional components 26 to facilitate the present purposes. For example, FIG. 1 depicts a large screen audio-video display 24 that may be used to inform players 16 via personalized messages of various lottery functions, including greetings and instructions as to how the player 16 can collect the points or credit assigned to their particular activity. The display 24 may be controlled directly by the game server 20, or via another functional component that is in communication with the server 20, such as the ticket checker 28.

In FIG. 1, the player ("Mary") is awarded 10 points simply for visiting the location 10 and making the communication connection with the server 20 as described herein. A personalized message 50 may be transmitted to the player 16 informing the player of the awarded points. The message 50 in the illustrated embodiment is sent the player's mobile smart device 18. The message 50 could also be transmitted to the screen 24, or any other functional component 26 in the location, such as a game console 30 (FIG. 2).

FIG. 1 also depicts a second personalized message 52 directed to the player 16 via the screen 24 informing the player that they were also awarded points for performing another game-related activity in the location 10, e.g., checking the status of a game ticket at the ticket checker 28.

FIG. 1 depicts the central game server 20 that is common to the communication-enabled locations 10. The term "game server" is used herein to encompass any configuration of computer hardware and software that is maintained by a lottery authority or game provider to carry out the functionalities of the present invention, as well as any manner of additional lottery functions. It should be readily appreciated that the server 20 may include an integrated server, or any manner of periphery server or other hardware structure. While the player 16 is in one of the locations 10 and within operating range of the BTLE transmitter and receiver components, the game server 20 is simultaneously in communication with any one or combination of the functional components 26 (e.g., ticket checker 28, display 24) and the player's mobile smart device 18, as described in greater detail below.

Figure 2:
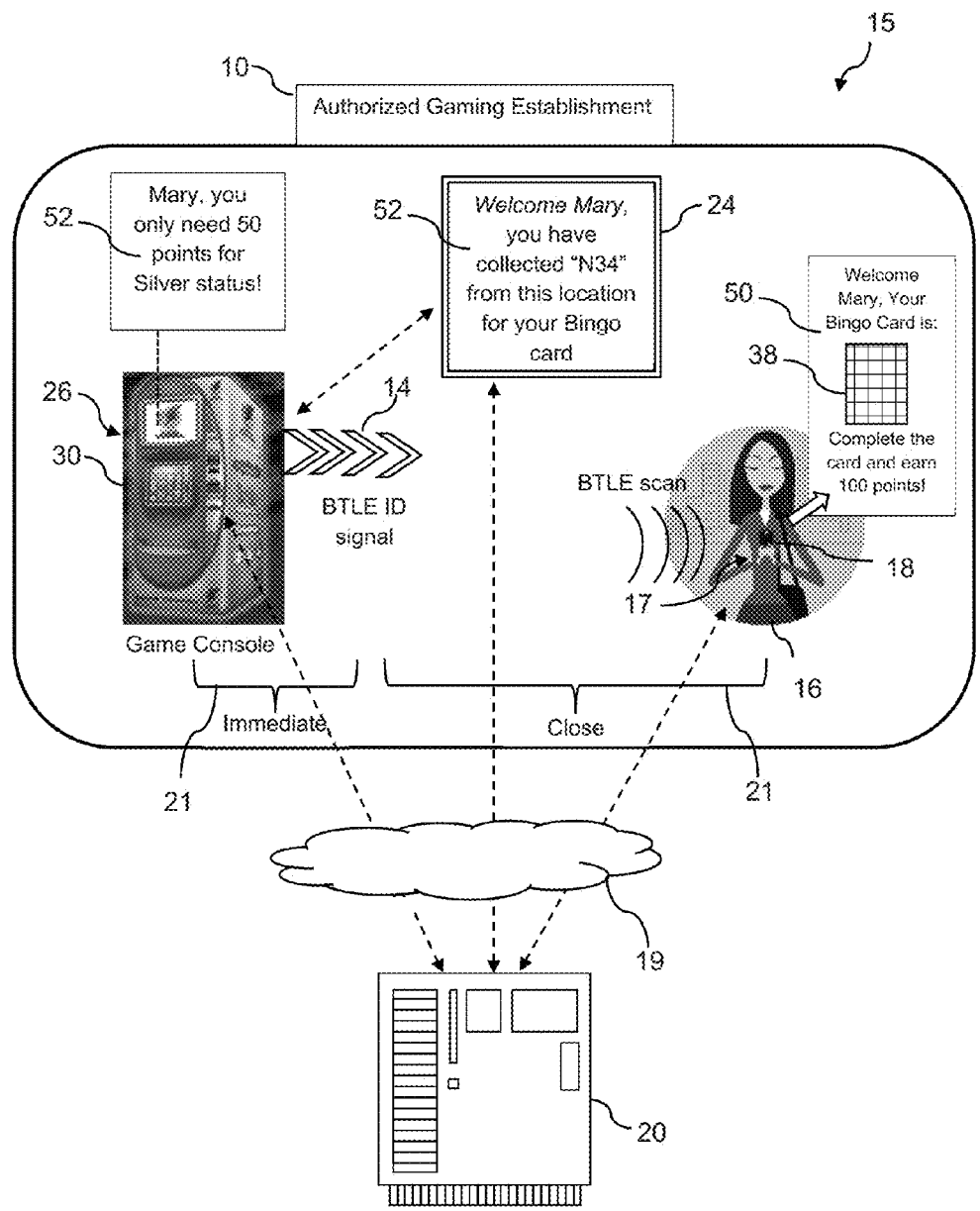
FIG. 2 is a diagram illustration of an alternate embodiment of a system and method wherein a player visits a communication-enabled location to collect points to be added to their player account.

FIG. 2 depicts a functional component 26 is the form of a game console 30 having a dedicated display and an input device, such as a ticket scanner, keyboard, touchscreen, or the like. This console 30 may have the transmitter 12 configured internally therein, and thus functions as the BTLE beacon in transmit or peripheral mode, while the player's mobile smart device 18 is in scan or central mode.

The console 30 has its own processor and control system in communication with the server 20 via the communications network 19 for interfacing with the player 16 so that the player can play a game, access their player account, or conduct any other manner of game related activities. The console 30 may also be in communication with the external display 24, as discussed above, to convey the personalized messages 50, 52 from the server 20 to the player 16 informing the player of points awarded, additional points available at the location 10 for various activities (message 52 in FIG. 1), present status level and points needed for next-higher status level (message 52 in FIG. 2), and so forth. The personalized messages 50, 52 may also be conveyed to the player 16 via the console's own dedicated screen, or via the player's mobile smart device 18.

The game server 20 is typically remote from the location 10, and is in communication with the plurality of the locations 10 via a suitable secure communication network 19, which may include any manner of wide area network, wireless internet, or cloud computing.

The game server 20 may be a single networked computer, or a series of interconnected computers having access to the communications network via a gateway or other known networking system. Generally, the game server 20 is configured to communicate with, manage, execute and control individual lottery terminal units within the lottery jurisdiction, including the lottery terminals 13 within the transmitter-enabled locations 10, and to interface with the network enabled mobile smart devices 18 of the players 16 that enter the locations 10. The game server 20 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The game server 20 may be directly or indirectly connected through the I/O bus to any manner of peripheral devices such as storage devices, wireless adaptors, printers, and the like. In addition, a database (DB) may be communicatively connected to the game server 20 and provide a data repository for the storage and correlation of information gathered from the individual components 28, 24, 18. The information stored within the database may be information relating to individual players, games, or game card specific information. For the present purposes, the database may also store the value assigned to each of the losing game tickets from the primary lottery.

It should be appreciated that embodiments of the methods and systems disclosed herein may be executed by one or more suitable networked lottery gaming components within a plurality of the locations 10, as well as a remote central computer system. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present systems and methods rely on the transmission of data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

Referring again to the embodiment depicted in FIG. 1, the game server 20 is in communication with the lottery component 26 that incorporates the transmitter 12 for controlling the functions of the component 26, such as the scanning and verifying capability of the ticket checker 28. This communication path may also allow the server 20 to control and/or monitor the operating status of the transmitter 12. In certain embodiments, the transmitter 12 may be programmable, for example to change the unique ID signal 14 emitted by the transmitter 12, and this function may be controlled by the game server 20. In other embodiments, such as BTLE beacons, the transmitter 12 is not programmable, but the game server 20 may monitor the operating status of the device. The functional component 26 may, in turn, have a dedicated display or be in communication with the large screen display 24, by way of which the game server 20 controls the display 24. Alternatively, the server 20 may be in direct communication with the display 24 if the display is also equipped with a processor.

In the configuration of FIG. 1, the player's mobile smart device 18 is in scan or central mode and detects the unique ID signal 14 from the transmitter 12. At this point, an application may be started to cause the device 18 to communicate with the game server 20 and relay at least the ID content of the signal 14 to the server 20. The application also identifies the player 16 to the server 20. For example, a unique player account number or other unique player ID code is transmitted to the server 20 along with the content of signal 14. With this information, the server 20 can access the player's account and is thus aware of the identity of the player 16 that is at the particular communication-enabled location 10. The server 20 thus has the ability to credit to the player's account the points assigned to the various activities performed by the player at the location 10. The activities are verified to the server 20 in that they are performed on functional components 26 in communication with the server 20. At this point, the server 20 can issue any manner of personalized messages 50, 52 to the player 16 via, for example, the display 24, other functional component 26 (e.g., the console 30), or directly to the player's mobile smart device 18, as depicted in FIG. 1.

In an alternative embodiment, Mary (the player 16) may be required to perform an action in addition to just visiting the location 10 to receive credit for the points. For example, the player may be required to purchase an item at the location 10, or enter a code that is strategically provided somewhere in the location 10 to encourage the player to view merchandise and hopefully make a purchase. In a particular method embodiment depicted in FIG. 2, the players 16 are required to collect a set of tokens 34 from a plurality of the communication-enabled locations 10 before the assigned point value for the activity (collection of tokens) is credited to their account. Each of the locations 10 is assigned a unique one of these tokens 34. The tokens 34 may be used to satisfy a pattern, order, or any other collection in an electronic game card 38. For example, in the embodiment of FIG. 2, the player 16 may be required to satisfy a Bingo pattern on an electronic Bingo card 38 with Bingo numbers (tokens 34) collected from different locations 10. The game cards 38 are stored electronically in the player's account, and are automatically retrieved and displayed to the player 16 via their mobile smart device 18 (as depicted by the message 50 in FIG. 2), which may generate an alert to the player 16 once the game cards 38 have been transmitted by the server 20. In an alternative embodiment, the game cards 38 may be displayed directly on the screen 24 so that the player 16 does not have to physically interact with their mobile device 18. In this particular game, because Mary has visited the location 10, she is given the Bingo number "N34" (as depicted by the message 52 on the screen 24) to be used to complete a particular pattern on one or more of the cards 38.

As mentioned, the game card 38 may be stored in the player's account and retrieved by the game server 20 once the player has been identified. The game server 20 transmits an electronic version of the card 38 to the player, as depicted in FIG. 2. Once the game card 38 has been satisfied, the server 20 will automatically credit the player's account with the valued assigned to the respective activity and inform the player 16 via a personalized message at the location 10.

The tokens 34 (e.g., Bingo numbers) may be randomly generated at each occurrence of a player visit to one of the locations 10. Alternatively, the tokens may be randomly assigned to specific locations 10 for a set time. For example, the Bingo number "N34" may be randomly generated and assigned to a particular location 10 for a 24-hour period such that all players 16 that visit the location 10 with an enabled device 18 will receive the same "N34" within the 24-hour period.

FIG. 2 also depicts that a distance 21 from the player 16 to the transmitter device (within the console 30) can be accurately calculated as a function of signal strength from the signal 14 received by the player's mobile smart device 18. The signal strength increases as the player 16 gets closer to the transmitter. Through calibration of the BTLE-enabled application running on the player's device 18 (or on the receiver in the location 10 if the BTLE beacon is carried by the player 16) for distance as a function of signal strength, the distance 21 between the player 16 and console 30 is accurately determined. This function may be useful for embodiments wherein the distance 21 causes certain game functions to be initiated at the console 30. The distance 21 can be broken down into segments, such as "close" or "immediate", wherein certain actions are initiated as the player 16 moves from one segment into the other segment.

With respect to FIG. 1, because the distance between the ticket checker 28 (with transmitter 12) and the console 30 is fixed and known, the distance between the console 30 and the player 16 is readily calculated by inclusion of the distance between the console 30 and the transmitter 12 in the calculation.

Figure 3:
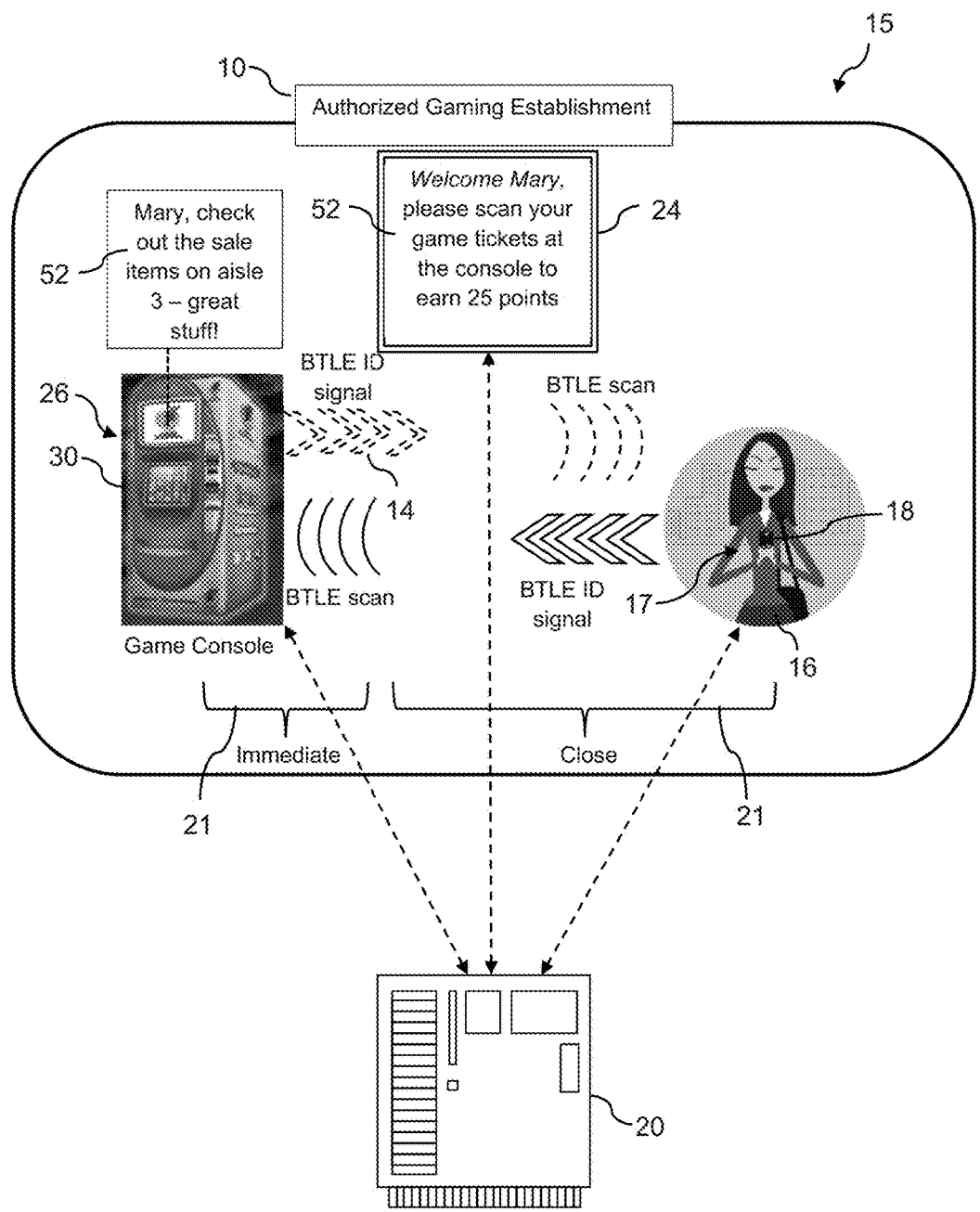
FIG. 3 is a diagram illustration of another embodiment of a system and method wherein a player visits a communication-enabled location to collect points to be added to their player account.

FIG. 3 depicts an embodiment wherein the functions of the game console 30 and the player's mobile smart device 18 are switched. In this embodiment, the console 30 is configured with BTLE scan capability, and is in communication with the server 20. The player's device 18 is configured as a transmitter or broadcast device that transmits an ID signal unique to the particular player. For example, the device 18 may have a BTLE beacon configured therewith having a unique ID signal that is associated with a particular player. Alternatively, the player may simply carry a dedicated broadcast device, such as a BTLE beacon in the form a keychain ornament, dongle, or the like. In this embodiment, the mobile smart device 18 may also be in communication with the server 20. The console 30 is in a generally constant scan mode and will detect the unique BTLE signal 14 emitted from a player's device 18 (or separate BTLE beacon) within range and transmit the ID information from the signal 14 to the server 20. The unique ID signal 14 is correlated to a specific person by the server 20, which then generates and transmits the personalized message 22 to the game console 30 and/or to the display 24. The display 24 may be spaced from the console 30, and the message 22 sent to the display 24 may be triggered when the person is within the "close" distance segment. The message 22 on the display is meant to catch the player's attention and invite the player 16 to approach the console 30. When the player 16 enters the "immediate" distance segment, the console 30 may transmit another personalized message 22 that invites the player 16 to play a game or conduct other game activities on the console 30.

FIG. 3 also depicts (in dashed lines) that the player's device 18 and the console 30 may switch between scan mode and transmit mode so as to carry out any of the functions discussed above.

Figure 4:
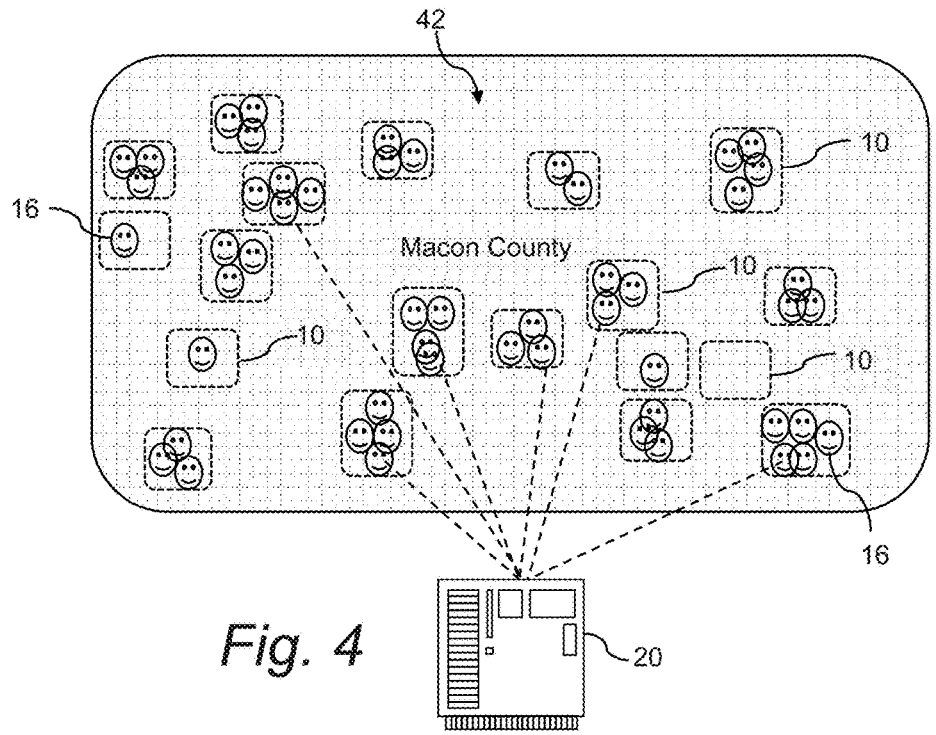
FIG. 4 is a diagram illustration of a gaming server in communication with a plurality of communication-enabled locations within a gaming jurisdiction.

FIG. 4 schematically depicts a partial lottery jurisdiction 42, which may be a county within a larger jurisdiction, such as a state. All of the authorized BTLE-enabled locations 10 are depicted in the display, which may be a map of the jurisdictional area with the locations indicated at their geographic location. As discussed above, BTLE-enabled players 16 that visit the locations 10 are uniquely identified by the server 20. Thus, at any given time, the server 20 is aware of not only the number of players 16 in any give location 10, but also the identity of such players 16. For example, FIG. 4 depicts certain locations 10 with no players, while other locations 10 have one, two, three, or four players. The ability to know exactly how many players 16 are within the plurality of different locations 10, as well as the identity of such players 16, enables unique game functions. For example, for purposes of collecting points or credit for game-related activities at the communication-enabled locations in accordance with the spirit of the present disclosure, the server may randomly select a player in a drawing from a pool of the identified players present in all of the locations 10. This selected player may be granted a bonus award for simply being present at a location, or may be granted a particular token 34 needed by the player to complete a game card 38, and so forth. The time of the drawing may be sent in a personalized message to all of the players in the pool (e.g., "Mike, you have been entered into a drawing to take place in 10 minutes—Good Luck!). The results of the drawing can be made known to each of the players 16 in another personalized message.

Figure 5:
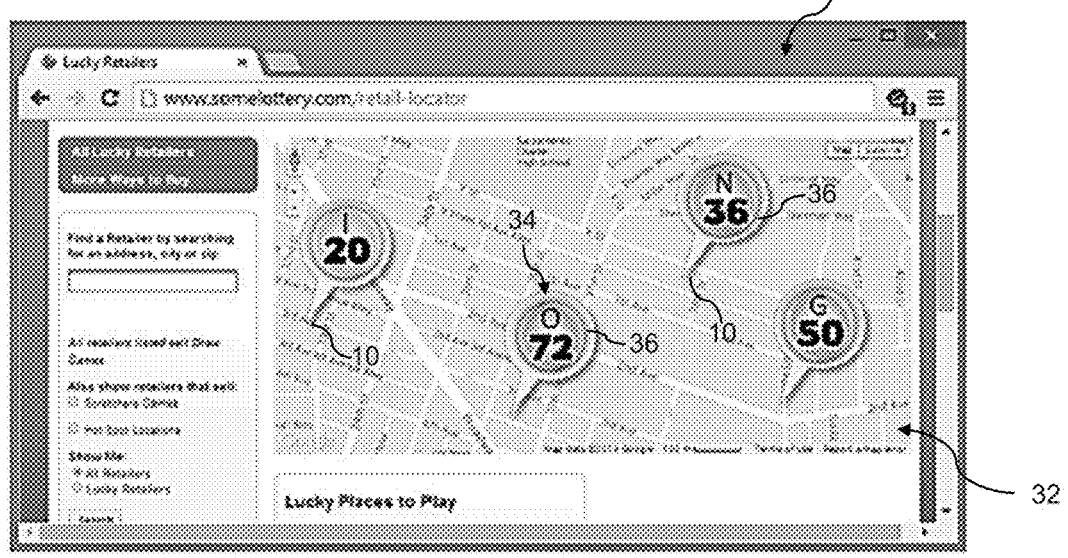
FIG. 5 is a screen shot of a web page displaying a plurality of authorized communication-enabled locations, as well as a particular token assigned to each location.

FIG. 5 is a screen shot of a functional display that may be provided to players 16 in the form of an electronic map 32 that gives the location of the BTLE-enabled locations 10 within a given jurisdiction (or geographic region of the jurisdiction). Thus, at any desired time, the players can access the website and determine if a participating location 10 is close by. FIG. 5 also depicts an option wherein the tokens 34 that have been assigned to each location 10 are identified to the players 16 via the map function. For example, the tokens 34 depicted in FIG. 5 are Bingo balls 36 (with Bingo numbers) that the player may use to complete a Bingo card 38, as discussed above. With this embodiment, the player can pick and choose the locations 10 they wish to visit as a function of the known tokens 34 that the player needs to complete their game card 38.

Figure 6:
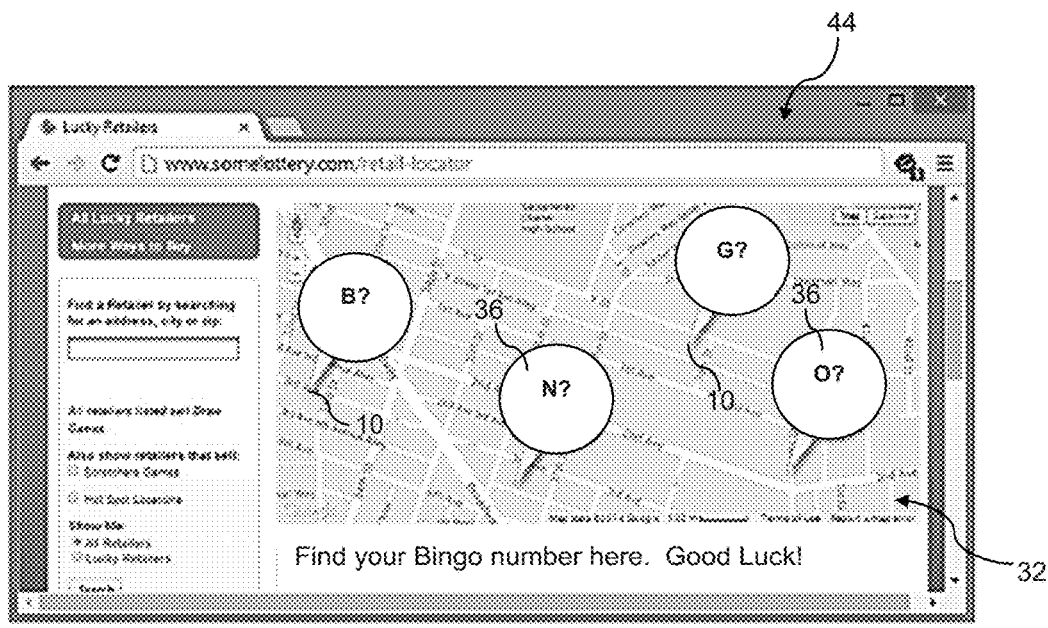
FIG. 6 is a screen shot of a web page displaying a plurality of authorized communication-enabled locations, as well as partial indication of a token assigned to each of the locations.

The screen shot in FIG. 6 is similar to that of FIG. 5 in that it provides the geographic location of the participating BTLE-enabled locations 10 within the geographic area. However, the tokens 34 are not made known (or are only partially revealed) to the player. For example, the tokens may be Bingo numbers that are only partially identified on the map as "N?" or "G?." If player needs a Bingo number in the "N" column, then they know which location 10 to visit for the chance of collecting such number. The actual tokens 34 assigned to the locations 10 may be randomly generated at the time the player 16 visits the location 10. Alternately, the tokens 34 may be randomly assigned beforehand, but are not made known to the player until they visit the location 10.

As another option, the players 16 may be made aware of the times in which the game tokens 34 are changed, or how long the game tokens 34 will remain available at the respective locations 10. These times may be indicated in any appropriate manner via the website depicted in the screen shots 44.

The various system 15 configurations discussed above with respect to FIGS. 1 through 6 enable method embodiments in accordance with aspects of the invention. For example, a method is provided wherein players in games of chance, e.g., lottery game players, have a personal player's account and accumulate points or credit in their account to achieve different hierarchy status levels. Player or loyalty accounts in general are well-understood, and are used in many lottery jurisdictions. With this method, the players advance in a status level hierarchy (e.g., from bronze, to silver, to gold) as points are accumulated. Gaming-related privileges or benefits of increasing value are associated with the hierarchy of status levels.

A plurality of physical locations, such as a retail store, convenience store, pub, restaurant, and so forth, are authorized by the gaming authority as communication-enabled locations and are configured with a transmitter device that broadcasts an ID signal unique to the communication-enabled location or a receiver that receives an ID signal unique to a particular player that visits the location. The identity and location of the communication-enabled locations are published to the players, for example via an electronic map at a website accessible by the players.

The players are provided with the capability to receive the unique ID signals emitted by the transmitter devices within the communication-enabled locations on a mobile smart device, or to broadcast the ID signal unique to the player for receipt by the receiver in the communication-enabled locations.

Point values are assigned to different game-related activities that can be performed by the players at the communication-enabled locations. These activities can vary widely, and may include simply visiting the location, checking ticket status at the location, buying game tickets at the location, playing a game at the location, and so forth.

A game server is common to the communication-enabled locations and, when a player is in one of the locations, automatically identifies the player and the particular communication-enabled location upon receipt of a transmission that includes at least part of the ID signal unique to the communication-enabled location or the ID signal unique to the player. Upon performance of one or more of the activities at the location, the game server automatically credits the player's account with the points assigned to the respective activities. The game server generates and provides a personalized message to the player in the communication-enabled location regarding the points assigned to their respective player account.

In one method embodiment, the personalized message informs the player how many points were awarded for a particular activity conducted in the communication-enabled location, and the number of points needed to achieve the next status level. A minimum number of points may be awarded to the player for visiting the communication-enabled location without further activity. It may be desired, however, for the personalized message to encourage (or even require) the player to view merchandise in the communication-enabled location for possible purchase prior to awarding the points to the player.

Embodiments may include providing functional components in the communication-enabled locations to allow the players to perform the game-related activities. These functional components may include any combination of a ticket checker, interactive game console, audio-video display, game terminal, and so forth.

The method may desirably include publishing the identity and location of the communication-enabled locations to the players via an electronic map provided on a website.

In a particular embodiment, the players are required to collect a set of tokens from a plurality of the communication-enabled locations before the assigned point value for the activity is credited to their account. Each of the communication-enabled locations may have a unique one of the tokens assigned thereto, which can be identified on the electronic map provided to the players. For example, the tokens may be Bingo numbers and the players are required to collect Bingo numbers to satisfy a Bingo pattern on an electronic Bingo card. The Bingo cards may also be stored in the player's account and retrieved by the game server and transmitted to the player or a functional component in the communication-enabled location when the location and player are identified To enable the communication aspects of the method, the players may be provided one or more of the following: an application for download to a mobile smart device carried by the player, the application enabling receipt and recognition by the mobile smart device of the unique ID signals emitted by the transmitter devices within the communication-enabled locations; (2) an application for download to a mobile smart device that causes the mobile smart device to transmit the ID signal unique to the player for receipt by the receiver in the communication-enabled locations; or (3) a personal broadcast device that broadcasts the ID signal unique to the player. The game server may be in secure communication with one or all of: the player's mobile smart device; the receiver at the communication-enabled location; or a functional component at the communication-enabled location for communicating with the player.

In particularly desirable embodiments, the transmitter device is a Bluetooth Low Energy (BTLE) beacon that emits a unique BTLE ID signal, and the application downloaded to the player's mobile smart device receives the BTLE ID signal and transmits all or a portion of the BTLE ID signal to the game server. The BTLE beacon may be incorporated with a functional component display in the BTLE-enabled location, the game server communicating the personalized message to the player via the display.

In certain embodiments, the game server communicates the personalized message to the player via the player's mobile smart device. In other embodiments, the message may be delivered to a functional component in the location, such as an audio-video screen, game console, and so forth.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method wherein game of chance players have a personal player's account and accumulate points or credit in the account to achieve different status levels, the method comprising:
    designating a plurality of set physical locations as authorized communication-enabled locations, each physical location being a knowing and pre-authorized participant in the game to carry out game activities related to the method, wherein each location is configured with a transmitter device that is located at the location and broadcasts an ID signal within a limited range that encompasses public areas of the location accessible to the players, the ID signal unique to the communication-enabled location, or each location configured with a receiver that receives an ID signal unique to a particular player in the public areas of the location;
    providing the identity and location of all of the communication-enabled participating locations to all of the players before the players commence the game, wherein each player is free to choose any one of the participating locations to commence the game regardless of the player's actual starting location;
    providing the players with capability to receive the unique ID signals emitted by the transmitter devices within the communication-enabled locations on a mobile smart device, or to broadcast the ID signal unique to the player for receipt by the receiver in the communication-enabled locations;
    assigning point values to different game-related activities that can be performed by the players at the communication-enabled locations and before the game commences, identifying to the players a relationship between the game-related activities at each of the different communication-enabled locations and the point values so that the player is able to base a decision on which of the communication-enabled locations to visit based on the identified relationships;
    providing a game server that is common to the communication-enabled locations, wherein when the player is in one of the communication-enabled locations, the game server automatically identifies the player and the particular communication-enabled location upon receipt of a transmission that includes at least part of the ID signal unique to the communication-enabled location or the ID signal unique to the player;
    the game server verifying activities performed by the player at the communication-enabled location and automatically crediting the player's account with the points assigned to the activities,
    providing a personalized message to the player regarding the points assigned to their respective player account; and
    wherein the player advances in a status level hierarchy as points are accumulated, with gaming-related privileges or benefits of increasing value associated with the hierarchy of status levels.

2. The method as in claim 1, wherein the personalized message informs the player how many points were awarded for a particular activity conducted in the communication-enabled location, and the number of points needed to achieve the next status level.

3. The method as in claim 1, wherein a minimum number of points are awarded to the player for visiting the communication-enabled location without further activity.

4. The method as in claim 3, wherein the personalized message encourages the player to view merchandise in the communication-enabled location for possible purchase.

5. The method as in claim 1, wherein functional components are provided in the communication-enabled locations to allow the players to perform the game-related activities, the functional components including any combination of a ticket checker, interactive game console, audio-video display, and game terminal, and wherein the transmitter or the receiver is configured in one of the functional components located in the communication-enabled.

6. The method as in claim 1, wherein the identity and location of the communication-enabled locations are published to the players via an electronic map provided on a website.

7. The method as in claim 6, wherein the players are required to collect a set of tokens from a plurality of the communication-enabled locations before the assigned point value for the activity is credited to their account, each of the communication-enabled locations having a unique one of the tokens assigned thereto, the electronic map also identifying the token assigned to each of the communication-enabled locations.

8. The method as in claim 7, wherein the tokens are Bingo numbers and the players are required to collect tokens to satisfy a Bingo pattern on a Bingo card.

9. The method as in claim 1, wherein the players are provided one or more of: (1) an application for download to a mobile smart device carried by the player, the application enabling receipt and recognition by the mobile smart device of the unique ID signals emitted by the transmitter devices within the communication-enabled locations; (2) an application for download to a mobile smart device that causes the mobile smart device to transmit the ID signal unique to the player for receipt by the receiver in the communication-enabled locations; or (3) a personal broadcast device that broadcasts the ID signal unique to the player.

10. The method as in claim 9, wherein the game server is in secure communication with one or all of: the player's mobile smart device; the receiver at the communication-enabled location; or a functional component at the communication-enabled location for communicating with the player.

11. The method as in claim 9, wherein the transmitter device is a Bluetooth Low Energy (BTLE) beacon that emits a unique BTLE ID signal, and the application downloaded to the player's mobile smart device receives the BTLE ID signal and transmits all or a portion of the BTLE ID signal to the game server.

12. The method as in claim 11, wherein the BTLE beacon is incorporated with a functional component display in the BTLE-enabled location, the game server communicating the personalized message to the player via the display.

13. The method as in claim 12, wherein the functional component is one of a ticket checker device that scans game tickets presented by the player and communicates with the game server to verify or authenticate the game tickets, or a game console wherein the player can interactively engage with the game server to perform game-related functions.

14. The method as in claim 9, wherein the game server communicates the personalized message to the player via the player's mobile smart device.

\* \* \* \* \*